United States Patent [19]

Kinaga

[11] 4,349,226

[45] Sep. 14, 1982

[54] SEATBELT SYSTEM

[75] Inventor: Eiichi Kinaga, Toyota, Japan

[73] Assignee: Toyota Jidosha Kogyo Kabushiki Kaisha, Aichi, Japan

[21] Appl. No.: 149,473

[22] Filed: May 13, 1980

[51] Int. Cl.³ .................... A47C 15/00; B65N 75/48
[52] U.S. Cl. ............................ 297/475; 242/107.4 D
[58] Field of Search ............... 242/107.4 D, 107.4 A, 242/107.6; 297/475

[56] References Cited

U.S. PATENT DOCUMENTS 3,915,495 10/1975 Oehm ............................ 297/475
4,147,387 4/1979 Coenan ......................... 297/475

Primary Examiner—Doris L. Troutman
Attorney, Agent, or Firm—Stevens, Davis, Miller & Mosher

[57] ABSTRACT

A seatbelt system including a seatbelt retractor. The retractor includes a frame, a take-up shaft rotatably coupled to the frame, first and second take-up springs connected in series to the take-up shaft, a gear wheel rotatably coupled to the frame and provided between the first and second take-up springs and a means for preventing the rotation of the gear wheel when the anchor plate is moved upon application of the seatbelt, whereby during the application of the seatbelt only the tension of the first take-up spring acts on the seatbelt.

10 Claims, 4 Drawing Figures

FIG. I

SEATBELT SYSTEM

BACKGROUND OF THE INVENTION

1. Field of the Invention

The present invention relates to seatbelt systems for protecting the occupant of a motor vehicle during a vehicular emergency and more particularly to seatbelt systems which also reduce the pressure felt by the occupant during the application of the seatbelt.

2. Prior Art

Generally a seatbelt system is designed to provide the seatbelt with tension so as to wind-up one end of the occupant restraining seatbelt onto a take-up device installed in the vehicle, to keep the seatbelt in close contact with the occupant during the application of the seatbelt and to wind-up most of the seatbelt after the seatbelt has been released from the use in order to prevent the scattering of the seatbelt around the vehicle.

However, the tension applied to the seatbelt affects the occupant of the vehicle by causing a feeling of pressure. The winding-up portion generating the above-described seatbelt tension is not reducible below a specified value due to the necessity for securing the winding-up of the seatbelt when the seatbelt is not in use. As a result, this tension can cause fatigue in the occupant.

Particularly, in two-door vehicles, because the shoulder seatbelt is anchored to a position relatively closer to the rear part of the vehicle, the portion of the seatbelt wound out from the take-up shaft is large and this causes an increased feeling of pressure on the occupant's shoulder.

Consequently, in the prior art various types of take-up systems designed to provided low level winding-up force in order to reduce the pressing feeling on the occupant of the vehicle after applying the seatbelt have been proposed. Of these systems, devices designed to mechanically control the seatbelt winding-up force have a drawback in that the reduced winding-up force is released and becomes a high level winding-up force when the occupant moves to some extent in the vehicle. Other devices designed to reduce the winding-up force operate through the interlock with the opening and closing operation of the door and such systems have a danger of inadvertently causing the seatbelt to be caught between the door and the vehicle body. Also, a mechanism installed in the buckle such as a switch so as to lock the take-up shaft by using a solenoid, etc., have been proposed but such systems are very expensive.

SUMMARY OF THE INVENTION

Accordingly, it is a general object of the present invention to provide a seatbelt system with a simple structure which eliminates the pressing feeling imposed on the occupant.

It is another object of the present invention to provide a seatbelt system which is high in reliability.

In keeping with the principles of the present invention the objects are accomplished by a unique seatbelt system which includes a retractor. The retractor includes a frame, a take-up shaft rotatably coupled to the frame, first and second take-up springs connected in series to the take-up shaft, a gear wheel rotatably coupled to the frame and provided between the first and second take-up springs and a means for preventing the rotation of the gear wheel when the anchor plate is moved upon application of the seatbelt, whereby during the application of the seatbelt only the tension of the first take-up spring acts on the seatbelt.

BRIEF DESCRIPTION OF THE DRAWINGS

The above-mentioned features and objects of the present invention will become more apparent with reference to the following description taken in conjunction with the accompanying drawings, wherein like reference numerals denote like elements and in which.

DETAILED DESCRIPTION OF THE INVENTION

Figure 1:
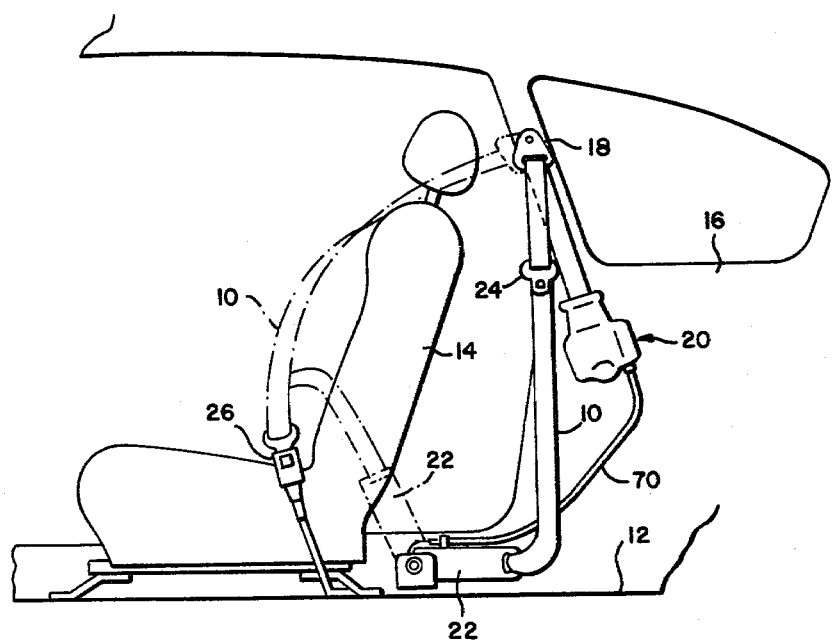
FIG. 1 is a side view from the inside of the motor vehicle illustrating an embodiment of the seatbelt system in accordance with the teachings of the present invention.

Referring more particularly to the drawings, shown in FIG. 1 is an occupant restraining belt 10 designed as a so-called three-point seatbelt system to restrain the waist and shoulder areas of an occupant sitting in the seat 14 of the vehicle 12.

In the seatbelt system, the middle part of the belt 10 is folded back through ring 18 supported axially by a side wall 16 of the vehicle 12 while one end of the belt 10 is wound up on a retractor 20 installed on the side wall 16. Also, the other end of the belt 10 is anchored to an anchor plate 22 provided at the lower portion of the side wall 16 and between the anchor plate 22 and the through ring 18, a tongue plate 24 which is movable in the longitudinal direction of the belt 10 is provided. Therefore, when the occupant sitting in the seat 14 anchors the tongue plate 24 to the buckling system 26 provided in the center of the vehicle, the belt 10 is bent in a manner such that one side of the belt 10 comes into contact with the area around the shoulder of the occupant and other side of the belt 10 comes into contact with the area around the waist of the occupant, respectively, as shown by the double dot chain lines in FIG. 1. As a result, a three-point type seatbelt system is applied to the occupant.

Figure 2:
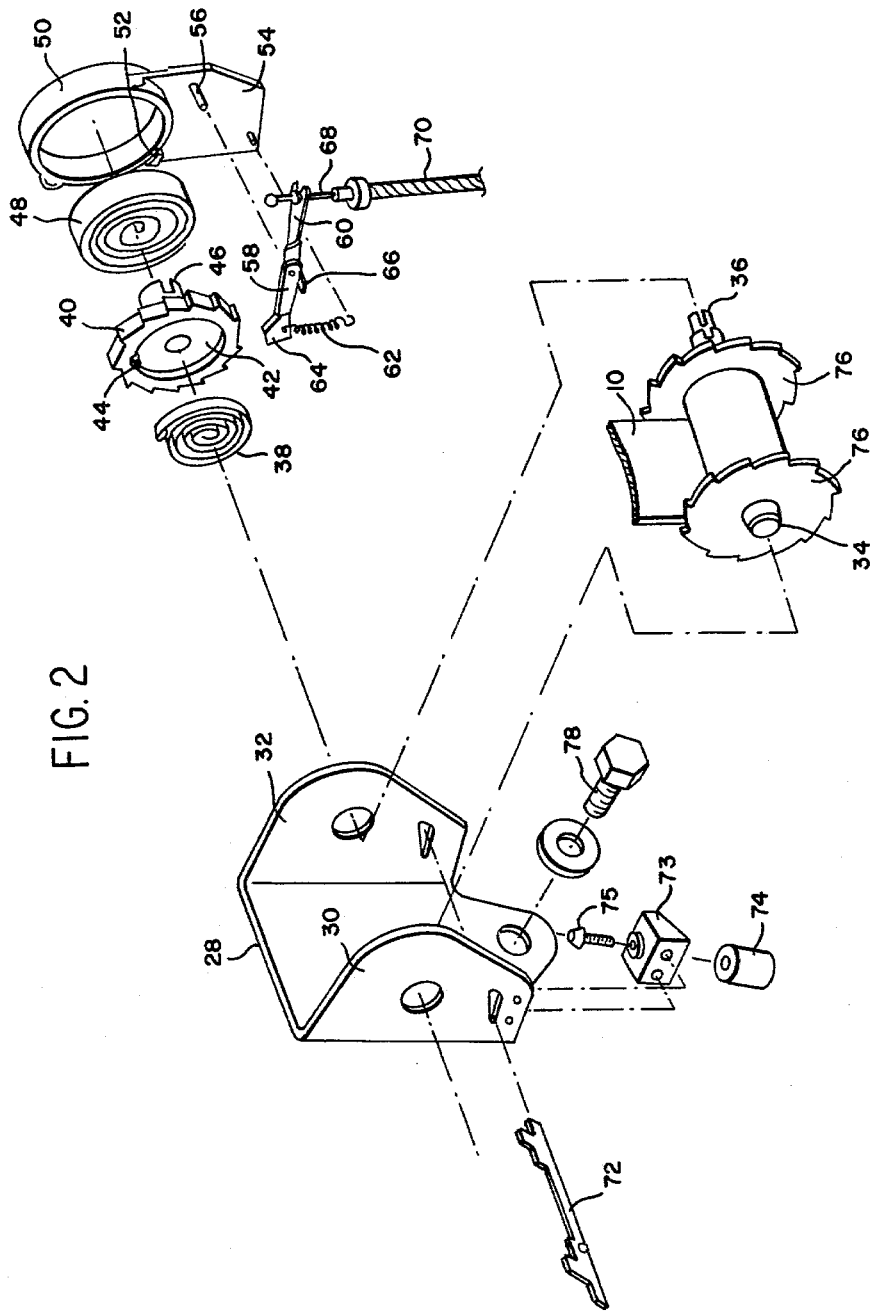
FIG. 2 is an exploded oblique view of a retractor in accordance with the teachings of the present invention.

Referring to FIG. 2, shown therein is a retractor 20 equipped with a frame 28. The frame 28 includes legs 30 and 32 provided in parallel to each other and extending from both sides of the frame 28. A take-up shaft 34 is axially supported by the legs 30 and 32. On to the take-up shaft 34 is wound the end of the belt 10 in layers.

In one end of the take-up shaft extending outwardly from the leg 32 is provided a slit 36. Into this slit 36 is inserted the inner end of a first spiral take-up spring 38. The first spiral take-up spring 38 is designed to be inserted into a round depressed area 42 in a gear wheel 40 which is coaxially supported by the take-up shaft 34. In addition, the outer end of the first spiral spring 38 is anchored to a pin 44 on the gear wheel 40.

Around the outer periphery of the large diameter of the gear wheel 40, is formed a ratchet wheel. Also, a slit 46 is provided in the small diameter area of the gear wheel 40 and the inner end of a second spring 48 is installed in the outer periphery of the small diameter area and is inserted into the slit 46. The other end of the second spiral take-up spring 48 is configured to be inserted into a slit 52 in the cover 50 which is installed on the leg 32 on the frame 28. In this example, the take-up force of the second spiral spring 48 is assumed to be larger than that of the first spiral spring 38.

As a result, the first and second spiral springs 38 and 48 are arranged in series through the gear wheel 40 and both act to provide a wind-up of force on the take-up shaft 34 in the direction of the winding-up the seatbelt 10.

A shaft 56 extends from the installation plate 54 extending from the cover plate 50. The end of a locking lever 58 and an end of a force receiving lever 60 are respectively coaxially supported by the shaft 56. The locking lever 58 is moved in a direction along which a locking part 64 provided at its end is caused to disengage from the ratchet gear on the gear wheel 40 by the operation of a tensile coil spring 62 provided between the locking lever 58 and the installation plate 54. However, the locking lever 58 is designed such that when the force receiving lever 60 rotates, the locking lever 58 is rotated by a protrusion 66 from the force receiving lever 60 acting against the force of the coil 62 so as to engage with the gear wheel 40. When the locking part 64 engages with the gear wheel 40, the rotation of the gear wheel 40 in the winding-up direction is blocked. As a result, the transmission of winding-up force of the second spiral spring 48 to the take-up shaft 34 is blocked and only the take-up force of the first spiral spring 38 is transmitted to the take-up shaft 34.

It is desirable that the above-described force receiving lever 60 be in the form of the leaf spring. To one end of a force receiving lever 60, one end of a wire 68 is anchored, and this wire 68 causes the force receiving lever 60 to rotate when the anchor plate 22 is rotated. When the motion of the wire 68 exceeds a predetermined quantity, the force receiving lever 60 comprised of a leaf spring is bent is absorb the unnecessary movement. One end of the wire cover 70 protecting the wire 68 is fastened to the frame 28.

To the frame 28, a pawl 72 is axially fixed in the space between the legs 30 and 32 and the pawl 72 is pushed upwardly by the head 75 of a pendulum 74 suspended through a bracket 73 and can engage with a ratchet wheel 76 fastened to the take-up shaft 34. With this construction, the pawl 72 is caused to disengage from the ratchet wheel 76 as a result of its own weight during ordinary running of the motor vehicle. However, during an emergency the pendulum 74 oscillates and pushes the pawl 72 upwardly thus engaging the pawl 72 with the ratchet wheel 76. As a result, the ratchet wheel 76 stops the rotation of the take-up shaft 34 in the winding-out direction to thereby stop the belt 10.

Figure 3:
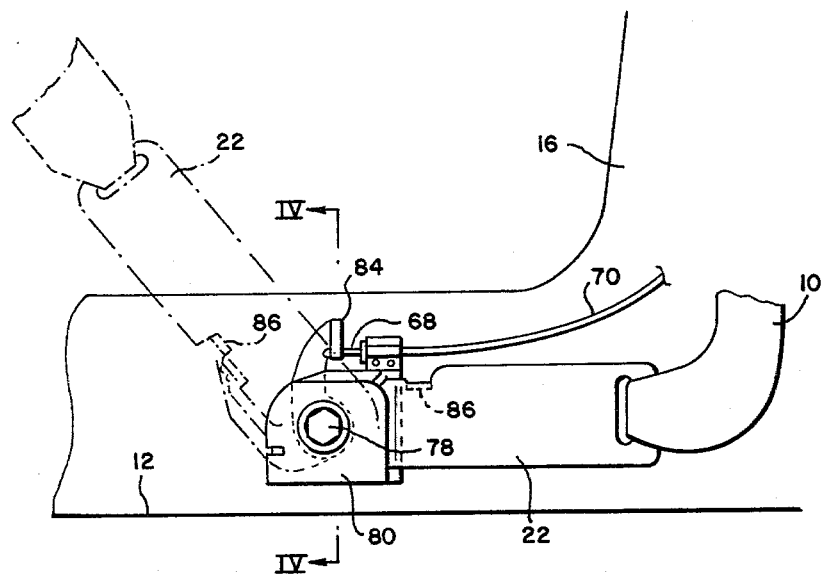
FIG. 3 is a partial enlargement of FIG. 1.
Figure 4:
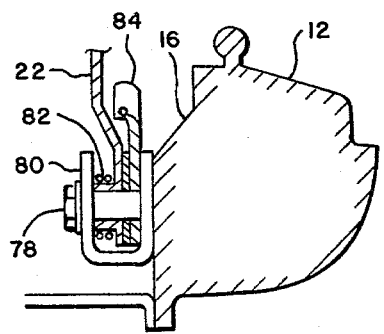
FIG. 4 is a section of FIG. 3 along the line IV—IV.

As is shown in FIGS. 3 and 4, the anchor plate 22 is axially fixed by a bolt 78 to a U-shaped plate 80 fastened to the lower side wall 16 by a bolt 78. The anchor plate 22 is designed to be rotated until its longitudinal direction turns towards the rear part of the vehicle as a result of the force of a torsion coil spring 82 provided between the anchor plate 22 and the U-shaped plate 80, as is shown in FIG. 3, during the non-application of the seatbelt 10 to the occupant of the motor vehicle. As a result, the anchor plate is arranged such that the anchor plate 22 does not hinder the action of a rear occupant in getting into and out of the vehicle.

To the bolt 78, in the same manner as the anchor plate 22, a rocker arm 84 is coaxially coupled and one end of the wire 68 which is coupled to the force receiving lever 60 at its other end is coupled to the rocker arm 84. Therefore, the rocker arm 84, wire 68, force receiving lever 60 and the locking lever 58 comprise a locking system for locking the gear wheel 40 when necessary.

As is shown in FIGS. 1 and 3, when the belt 10 is not applied to the occupant (that is when the anchor plate 22 is kept nearly in a horizontal position), the rocker arm 84 is rotated in a clockwise direction from its maximum position thus allowing the gear wheel 40 in the retractor 20 to freely rotate, as is shown in FIG. 3. Also, as is shown by the double dot chain line in FIGS. 1 and 3, when the occupant of the vehicle applies the belt, the anchor plate 22 is rotated in the counterclock-wise direction, as is shown in FIG. 3, against the force of the tension coil spring 82 by the tension applied to the belt 10. During this counterclock-wise rotation, the protrusion 86 provided in the middle part of the anchor plate 22 rotates the rocker arm 84 in the counter-clockwise direction, as is shown in FIG. 3, to thereby pull the wire 68. As a result, the locking lever 58 is caused to be engaged with the gear wheel 40. The other end of the wire cover 70 is anchored to the U-shaped plate 80.

The performance of the above-described embodiment of the present invention can be explained in the following paragraphs. In FIGS. 1 and 3 is shown the state in which the belt 10 is not applied to the occupant of the vehicle. In this state, since the anchor plate 22 is in a horizontal position, the action of the occupant of the vehicle entering the rear seat of the vehicle 12 is not hindered.

Next, when the occupant takes the seat 14 and anchors the tongue plate 24 to the buckling device 26, the anchor plate 22 is rotated against the force of the torsion coil spring 82, as is shown by the double dot chain line in FIG. 3. Thereby, the rocker arm 84 rotated by the anchor plate 22 pulls the wire 68 and engages the locking lever 58 in the retractor 20 with the gear wheel 40.

As a result of the above, the accelerating force of the second sprial spring 48 is not transmitted to the take-up shaft 34 and only the weak force of the first spiral spring 38 is transmitted to the take-up shaft 34. Consequently, to the occupant of the vehicle to which the belt is applied only the weak force of the first spiral spring 38 is applied. Therefore, the fatigue of the occupant is reduced. Also, during the ordinary operation of the vehicle, it is possible for the occupant to change his seating position by winding-out the belt 10 from the retractor 20.

Furthermore, during the application of the belt 10, the force of the torsion coil spring 82 operates on the anchor plate 22 to rotate it in the clockwise direction as is shown in FIG. 1; however this does not happen because it is prevented by the frictional contact force between the waist of the occupant and the belt 10, and thus the anchor plate 22 is not rotated.

When a vehicular emergency occurs, the pendulum 74 pushes up the pawl 72 and the pawl 72 engages with the ratchet wheel 76 to immediately stop the winding-out rotation of the take-up shaft 34 to stop the unwinding of the belt 10. In this manner the safety of the occupant is secured by firmly restraining the occupant in the seat.

For the occupant to get out of the vehicle, he need only release the tongue plate 24 from the buckling device 26. When the tongue 24 is released from the buckling device 26, the anchor plate 22 is rotated from the position indicated by the double dot chain line to the position indicated by the solid line in FIG. 3 by the force of the torsion coil spring 82. Therefore, the rocker arm 84 moves the wire 68 to thereby release the locking lever 58 from the gear wheel 40. By this operation, the winding-up force of the second spiral spring 48 is applied to the take-up shaft 34 and the belt 10 is wound-up.

While in the above-described embodiment the locking device is operated by the rotation of the anchor plate 22, the present invention is not limited by such a construction. It should be apparent that any movement in any direction of the anchor plate 22 could be utilized to operate the locking device. For example, the anchor plate might be moved linearly.

It should be apparent to those skilled in the art, that the above-described embodiment is merely illustrative of but one of the many possible specific embodiments which represent the application of the principles of the present invention. Numerous and various other arrangements can be readily devised by those skilled in the art without departing from the spirit and scope the present invention.

I claim:

1. A seatbelt system for securing the safety of an occupant of a vehicle by restraining the occupant in an emergency of the vehicle, which comprises:
   a frame;
   a take-up shaft which is axially supported by said frame fastened to the vehicle body, and winds up one end of an occupant restraining seatbelt;
   a first spring coupled at one end to said take-up shaft which generates a force on the take-up shaft to wind-up the belt;
   a gear wheel supported axially by the frame, and to which the other end of the said first spring is anchored;
   a second spring having a force larger than the said first spring with one end anchored to the gear wheel and the other end anchored to the frame, whereby said second spring generates a larger winding-up force than the first spring for the take-up shaft to wind-up the belt;
   an anchor plate to which a part of the occupant restraining belt is anchored, said anchor plate being in a first position when the belt is not applied to the occupant and being in a second position during the application of the belt to the occupant; and
   a locking device which prevents rotation of said gear wheel when said anchor plate is in said second position, whereby during the application of the seatbelt to the occupant, only the weak acceleration of the first spring is transmitted to the take-up shaft thereby to reduce the feeling of pressure on the occupant.

2. A seatbelt system as set forth in claim 1, wherein the anchor plate is axially fixed to the vehicle body, and the first position is directed towards the rear part of the vehicle whereby a rear seat occupant is not bothered by said anchor plate while getting into or out of the vehicle.

3. A seatbelt system as set forth in claim 2, wherein the said anchor plate is biased towards the first position by an elastic body, and during the application of the belt to the occupant, said anchor plate is rotated to the second position by the tension of the belt against the biasing force of the elastic body.

4. A seatbelt system as set forth in claim 1, wherein said locking device comprises a wire and a locking lever to which the moving force of the anchor plate is transmitted, and the locking lever engages with the gear wheel when wire tension is transmitted to the locking lever during application of the belt to the occupant.

5. A seatbelt system as set forth in claim 4, wherein a rocker arm is connected to one end of said wire and said rocker arm is driven by the anchor plate when the anchor plate moves more than a specified quantity, thus generating the tension in the wire.

6. A seatbelt system as set forth in claim 4, further comprising a mechanism for absorbing any superflous stroke by deflexion when the wire stroke becomes more than necessary between said wire and said locking lever.

7. A seatbelt system as set forth in claim 1, wherein said first and second springs are spiral springs installed coaxially to the same shaft.

8. A seatbelt system as set forth in claim 7, wherein said gear wheel is axially supported by the end of the take-up shaft.

9. A seatbelt system as set forth in claim 8, wherein said first spring is inserted in a round depression area on the gear wheel, and said second spring is installed on the outer periphery of the gear wheel.

10. A seatbelt system designed such that a seatbelt to be applied to the occupant of the vehicle in order to protect the occupant in case of emergency such as the collision of the vehicle is provided, and during the application of said belt to the occupant, the feeling of pressure onto the occupant is reduced, said seatbelt system comprising:
   a frame installed on a vehicle body;
   a take-up shaft axially supported by said frame, which winds-up one end of the belt;
   a gear wheel supported rotatably upon and coaxially with said take-up shaft;
   a ratchet wheel comprising notches formed on the outer periphery of the gear wheel;
   a first spiral spring installed between said gear wheel and the take-up shaft which generates a belt winding-up force for the take-up shaft;
   a second spiral spring anchored to the gear wheel at one end and which generates a stronger force for winding-up the belt than the first spiral spring;
   a spring case installed on the frame which supports the other end of said second spiral spring;
   a locking lever cooperating with said ratchet wheel of the gear wheel;
   an anchor plate which is axially fixed to the vehicle body at one end and coupled to the belt at the other end, said anchor plate being in a first rotational position when the belt is not applied to the occupant and caused to be in a second rotational position by tension on the belt during the application of the belt to the occupant;
   an elastic body to bias the anchor plate towards the first rotational position; and
   a wire installed between said anchor plate and said locking lever for causing engagement of the locking lever with the gear wheel when the anchor plate is in said second position whereby the winding-up force of the first spring alone is transmitted to the take-up shaft thereby to generate a weak tension in the belt and reduce a pressing feeling on the occupant.

* * * * *